(12) United States Patent
Regal

(10) Patent No.: US 7,440,396 B1
(45) Date of Patent: Oct. 21, 2008

(54) DETERMINING THE POSITION OF A BAD LINK

(75) Inventor: Michael Lawrence Regal, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 837 days.

(21) Appl. No.: 10/722,735

(22) Filed: Nov. 24, 2003

(51) Int. Cl.
*H04J 1/16* (2006.01)

(52) U.S. Cl. .................................. 370/222; 370/242

(58) Field of Classification Search ................ 370/216, 370/222, 223, 224, 241, 242, 248, 249, 394
See application file for complete search history.

(56) References Cited

U.S. PATENT DOCUMENTS

| | | | | |
|---|---|---|---|---|
| 4,860,284 A | * | 8/1989 | Brown et al. | 370/452 |
| 5,684,789 A | * | 11/1997 | Habeck et al. | 370/244 |
| 6,202,082 B1 | * | 3/2001 | Tomizawa et al. | 709/201 |
| 6,269,083 B1 | * | 7/2001 | Nagata et al. | 370/248 |
| 6,865,149 B1 | * | 3/2005 | Kalman et al. | 370/225 |
| 6,993,684 B2 | * | 1/2006 | Ookawa et al. | 714/43 |
| 7,113,699 B1 | * | 9/2006 | Bhate et al. | 398/15 |
| 2004/0057375 A1 | * | 3/2004 | Shiragaki et al. | 370/216 |

OTHER PUBLICATIONS

Agilent Technologies, "Infiniium 54850 Series Oscilloscopes; InfiniiMax 1130 Series Probes; 7 GHz, 20 Gsa/s Differential and Single-Ended Oscilloscope Measurement System," Data Sheet, May 19, 2004, 26 pages, copyright 2004 Agilent Technologies, Inc., downloaded from the Internet: <http://cp.literature.agilent.com/litweb/pdf/5988-7976EN.pdf>.

Bytebrothers, "Real World Certifier: Performance Certify and Troubleshoot LAN Hardware and Cabling (10mb, 100mb, Gigabit)," product brochure, 4 pages, copyright 2004 Byte Brothers, Inc., downloaded from the Internet: <http://www.bytebrothers.com/pdf/RWC_web_brochure.pdf>.

* cited by examiner

*Primary Examiner*—Ricky Ngo
*Assistant Examiner*—Kan Yuen
(74) *Attorney, Agent, or Firm*—Charles E. Krueger

(57) ABSTRACT

A system for determining a bad link in a ring includes a start-up controller that transmits a link command having a position field holding initial value. Each device in the ring increments the value held in the position field of a received position command and transmits a modified position command having a position field holding an incremented value. If no valid position command is received at a device it transmits a modified position command having a position field holding the initial value. The start-up device compares the received value held in the position field of a received position command with an expected value to determine the existence and location of a bad link.

5 Claims, 3 Drawing Sheets

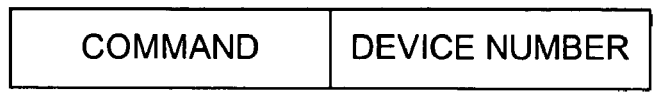
FIG. 2
FIG. 3
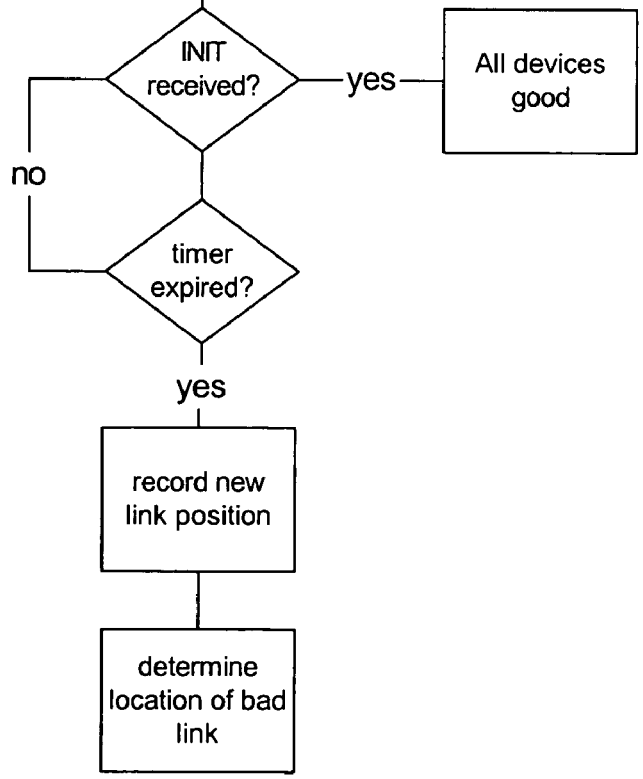

DETERMINING THE POSITION OF A BAD LINK

BACKGROUND OF THE INVENTION

A ring of devices, such as port ASICs or stacked network devices, can be configured to operate together to aggregate functionality. For example, routers can be stacked so that they appear to a user as a single device having the aggregate functionality of the stacked individual devices.

A supervisory functionality must be defined to manage the individual devices to transfer packets between ports on different devices and to perform other functions. The supervisory functionality can detect whether one of the links between devices or ports is not functional but the identity of the non-functional link must be determined by inspection.

For example, if the devices are port ASICs mounted on a PCB, then a physical hardware probe is used to determine the identity of the link that is not functioning properly. The use of a hardware probe is time consuming and expensive since it requires disassembly of the box and a skilled technician to perform the test.

Accordingly, new techniques for identifying faulty links in a ring of devices are important to increase efficiency.

BRIEF SUMMARY OF THE INVENTION

In one embodiment of the invention, at startup a device transmits a 'position' message to the downstream device connected to its transmitter link. A device's transmitted 'position' value is based on the 'position' value in the message received from the upstream device connected to its receiver link.

In another embodiment of the invention, if no 'position' message is received from an upstream device, a device will advertise its 'position' as zero to its downstream link partner. If a 'position' message is received, a device will advertise its 'position' as being equal to the received message's 'position+1'.

In another embodiment of the invention, a supervisor receives a 'position' message from the most downstream device and compares it to an expected position number for a fully operational ring. If the supervisor determines that an unexpected value has been received, it can identify the physical location of the broken link as being equal to the expected value less the 'position' number received.

In another embodiment of the invention, the physical position of a broken link is found by passing a 'position' message along a path of operating links. The 'position' value received by a supervisory function can compare the received 'position' value against an expected value to immediately determine the first physically broken link.

Other features and advantages of the invention will be apparent in view of the following detailed description and appended drawings.

BRIEF DESCRIPTION OF THE DRAWINGS

FIG. 2 is table depicting the format of an INIT command;

FIG. 3 is flow chart depicting the behavior of the supervisory ASIC during INIT.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
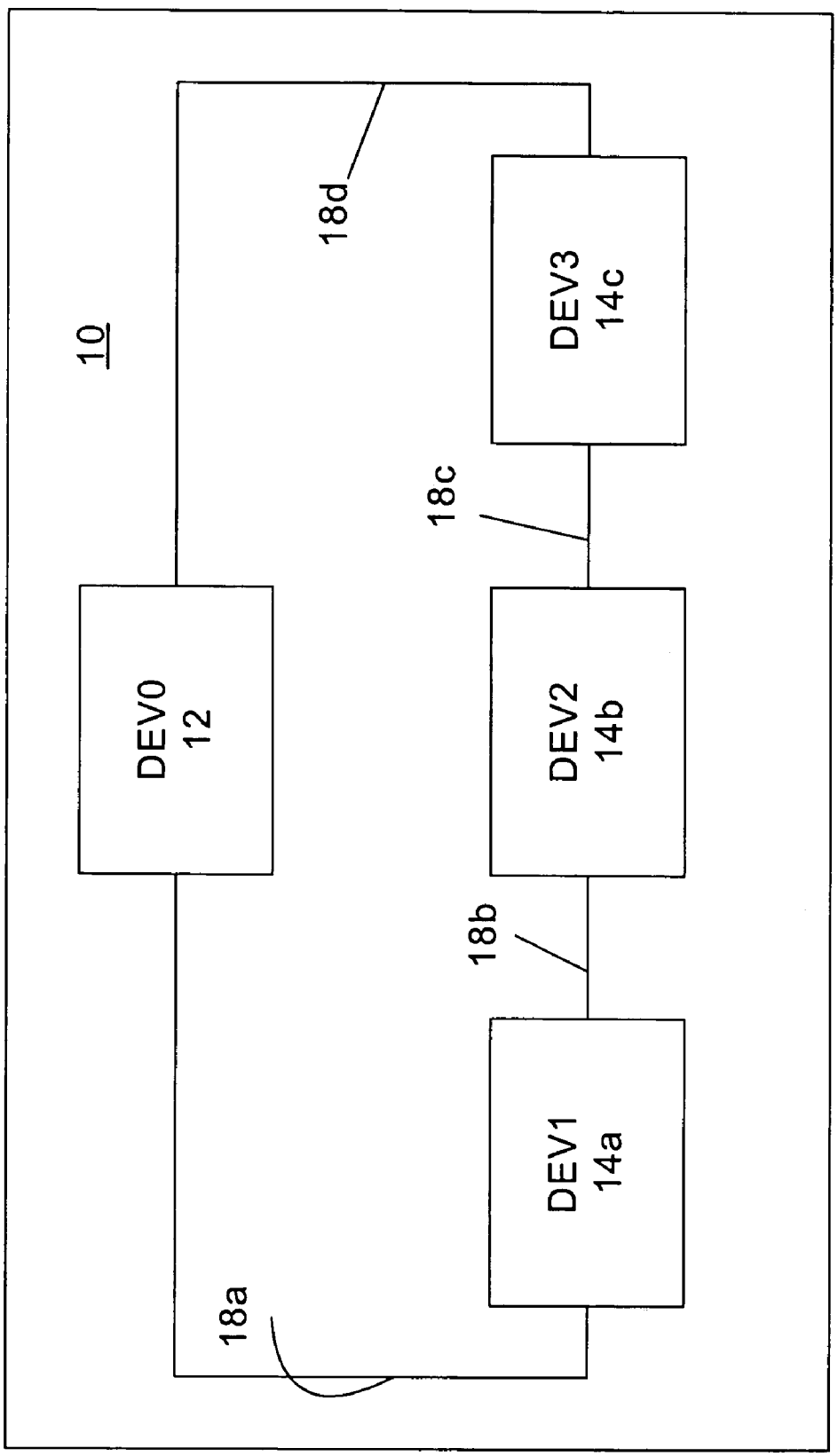
FIG. 1 is block diagram of a management ring.

An embodiment of the invention will now be described, by way of example, not limitation, implemented in the system depicted in FIG. 1. FIG. 1 depicts a management ring 10 including a Supervisory ASIC (DEV0) 12 and first, second, and third port ASICs (DEV1, DEV2, and DEV3) 14*a-c* disposed on a platform.

Each of the ASICs of FIG. 1 includes a management interface controller (MIC) including a receiver and a transmitter. In FIG. 1 the MIC receiver of DEV1 is coupled to the serial output of the supervisory ASIC (DEV0) by a first serial link 18*a*, the MIC transmitter of DEV1 is coupled to the MIC receiver of DEV2 by a second serial link 18*b*, the MIC transmitter of DEV2 is coupled to the MIC receiver of DEV3 by a third serial link 18*c*, and the MIC transmitter of DEV3 is coupled to the serial input of the supervisory ASIC (DEV0) by a fourth serial link 18*d*.

The MIC of a port ASIC includes a pass-through mechanism for rapidly forwarding messages from the MIC receiver to the MIC transmitter as soon as a determination is made that the port ASIC is not the target of the message.

In this embodiment, the bad link detection and identification process is performed during an initialization (INIT) process that can be triggered by a hard or soft reset, by an error condition, or by other means.

The platform includes a non-volatile memory device, for example an EEPROM, holding information about the platform including the number of port ASICs present on the platform. During the INIT process, the supervisory ASIC reads the non-volatile memory device to determine the number of port ASICs on the platform that should be functioning properly. In this example, counting begins at "0" so if the Supervisory ASIC reads "3" from the EEPROM it determines there are "4" ASICs on the board.

When the INIT process is triggered the supervisory ASIC outputs INIT. A special INIT message is used during the initialization process having a format depicted in FIG. 2. Referring to FIG. 2, the data format of the INIT includes a command field that identifies the format as a management ring initialize command and a device number field which is used to address the port ASICs and to determine the presence and identity of a bad link.

Figure 4:
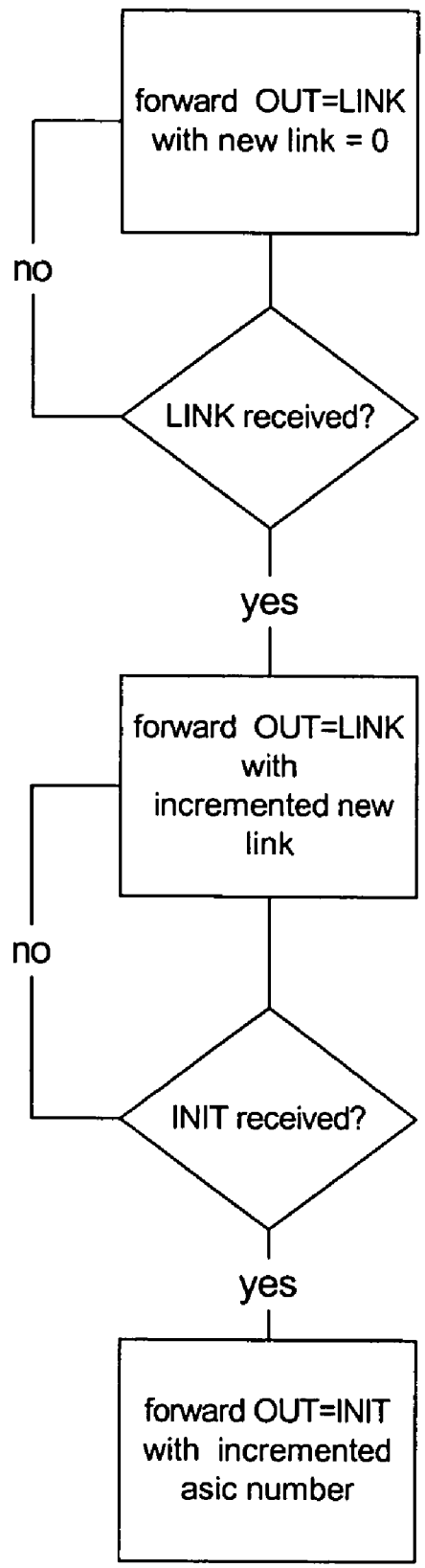
FIG. 4 is flow chart depicting the behavior of the port ASIC during INIT.

The behavior of the supervisory ASIC and port ASICs during the INIT process is depicted in the flow charts of FIGS. 3 and 4.

Referring to FIG. 3, during INIT the supervisory ASIC starts a tinier, outputs an INIT command having an device number field holding the value '0', and waits for an INIT command to be received. If an INIT command is not received before the timer times out a received new link position field is stored (see below) and an INIT failure is recorded.

Referring to FIG. 4, during INIT, until an INIT command is received a Port ASIC continuously forwards OUT='LINK' to its MIC Transmitter, advertising a new Link Position of "0". If its MIC Receiver link is operational, the Port ASIC continuously receives IN='LINK' from an upstream Port ASIC, advertising its new Link Position of "0". In response to receiving these advertisements, the Port ASIC increments and continuously forwards a modified new Link Position of 1 to its MIC Transmitter. This continues indefinitely, until the Port ASIC receives an 'NIT' on its MIC Receiver.

As an example, in a system with 6 Port ASICs and no broken links, the Port ASIC sharing a link with the Supervisor ASIC's MIC Receiver link would advertise a new Link Position of "5"; the one Port ASIC sharing a link with the Supervisor ASIC's MIC Transmitter link would advertise a new Link Position of "0".

When the INIT command is received at the MIC receiver of a port ASIC the port ASIC records the value held in the device number field of the received INIT command as its ID, increments the value held in the device number field, and outputs a modified INIT command having an device number field holding the incremented value.

If each serial link is functioning properly, the supervisory ASIC outputs an INIT command having a device number field holding a value of '0'. This value is incremented to '1' by DEV1, to '2' by DEV2, and to '3' by DEV3. Thus, if every link on the ring is functioning then the supervisory receives an INIT command having an device number field having a value of '3' which corresponds to the number of devices that the supervisory ASIC knows, are on the platform from having read the storage device on the platform.

The case where the second serial link 18b is defective will now be described. DEV2 does not receive a valid INIT or LINK command. In this case, DEV2 will output a LINK command having a new link position field holding a value '0' since no valid command is received at its MIC receiver. This value will be incremented to '1' by DEV3 so that a LINK command having a new link position field holding the value '1' is received at the supervisor ASIC (DEV0).

Because the second serial link 18b is defective, no INIT command will ever be received at the input of the supervisory ASIC so that the timer will time out and an INIT failure will be recorded and supervisory ASIC knows that there is a defective link in the management ring. Also, the value held in the stored new link field can be examined, in this case the value is "1", to determine that the second serial link 18b is the defective link.

In this example, a new link field value of "1" indicates that the second serial link 18b is defective, and a new link field value of "0" indicates that third serial link 18c is defective. If all links were good the supervisory ASIC would receive "good value" of '3'. If one of the links is bad the location of the bad link is indicated by the difference between the good value and the received value. In the above example, if the second link 18b is bad, link value "1", then the received value of "2" identifies the second link 18b.

If the fourth link 18d were defective the supervisory ASIC would receive in invalid command and therefore know that the fourth link 18d coupled to its input is defective.

Other embodiments of the invention are not limited to ASICs on a single platform. For example, a stack of network devices, e.g., routing platforms, can be configured as a ring and one of the devices designated to function as a supervisor or start-up device. The processes described above would them be utilized to determine whether one of the links is defective and to identify which link is defective.

Alternatively, the system could be configured to include network devices and/or port ASICs on the devices.

As is known in the art, the mechanisms for implementing the various steps may be embodied in hardware or may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. Accordingly, it is not intended to limit the invention except as provided by the appended claims.

What is claimed is:

1. A method comprising:
   transmitting an initial command from a supervisory device included in a ring of linked devices including the supervisory device and a plurality of port devices, with each device in the ring including an output and an input, with the input of each device in the ring coupled by an upstream link to the output of an upstream device in the ring and with the output of each device in the ring coupled by a downstream link to the input of a downstream device in the ring and with the initial command having a device number field holding an initial value;
   receiving the initial command on the upstream link coupled to a port device and, when the command is received, incrementing a value held in the device number field and transmitting the initial command with an incremented value on the downstream link coupled to the port device;
   initially outputting link messages on the downstream link coupled to each port device prior to receipt of the initial command, with the link messages holding a link position value equal to a fixed value;
   outputting incremented link messages on the downstream link coupled to each port device subsequent to receiving a link message on its upstream link and prior to receipt of the initial command, with the incremented link messages holding a link position value equal to an incremented link position value where the incremented link position value is equal to the link position value received on the upstream link incremented by one;
   storing a new link position value received on the upstream link coupled to the supervisory device; and
   comparing the new link position value to the number of devices in the ring to determine the location of a bad link in the ring of linked devices if the initial command is not received at the supervisory device before a time period expires.

2. The method of claim 1 further comprising:
   reading an external storage device to read a platform value indicating the number of devices in the ring.

3. A system comprising:
   means for transmitting an initial command from a supervisory device included in a ring of linked devices including the supervisory device and a plurality of port devices, with each device in the ring including an output and an input, with the input of each device in the ring coupled by an upstream link to the output of an upstream device in the ring and with the output of each device in the ring coupled by a downstream link to the input of a downstream device and with the initial command having a device number field holding an initial value;
   means for receiving the initial command on the upstream link coupled to a port device and, when the command is received, incrementing a value held in the device number field and transmitting the initial command with an incremented value on the downstream link coupled to the port device;

means for initially outputting link messages on the downstream link coupled to each port device prior to receipt of the initial command, with the link messages holding a link position value equal to a fixed value;

means for outputting incremented link messages on the downstream link coupled to each port device subsequent to receiving a link message on its upstream link and prior to receipt of the initial command, with the incremented link messages holding a link position value equal to an incremented link position value where the incremented link position value is equal to the link position value received on the upstream link incremented by one;

means for storing a new link position value received on the upstream link coupled to the supervisory device; and means for comparing the new link position value to the number of devices in the ring if the initial command is not received at the supervisory device before a time period expires to determine the location of a bad link in the ring of linked devices.

4. The system of claim 3 further comprising:

means for reading a platform value from an external storage device indicating the number of devices in the ring.

5. A system comprising:

a supervisory device for use in a ring of linked devices including the supervisory device and a plurality of port devices, with each device in the ring including an output and an input, with the input of each device in the ring adapted to be coupled by an upstream link to the output of an upstream device in the ring and with the output of each device in the ring adapted to be coupled by a downstream link to the input of a downstream device in the ring, with the supervisory device configured to transmit an initial command having a device number field holding an initial value and with the supervisory device configured to store a new link position value received on the upstream link coupled to the supervisory device and configured to compare the new link position value to the number of devices in the ring to determine the location of a bad link in the ring of linked devices if the initial command is not received at the supervisory device before a time period expires;

with each port device configured to initially output link messages on the downstream link coupled to each port device prior to receipt of the initial command, with the link messages holding a link position value equal to a fixed value, and to output incremented link messages on the downstream link coupled to each port device subsequent to receiving a link message on its upstream link and prior to receipt of the initial command, with the incremented link messages holding a link position value equal to an incremented link position value, where the incremented link position value is equal to the link position value received on the upstream link incremented by one.

* * * * *